United States Patent [19]

Drehman

[11] 3,894,110

[45] July 8, 1975

[54] CATALYTIC DEHYDROGENATION PROCESS

[75] Inventor: Lewis E. Drehman, Bartlesville, Okla.

[73] Assignee: Phillips Petroleum Company, Bartlesville, Okla.

[22] Filed: Nov. 15, 1973

[21] Appl. No.: 415,944

[52] U.S. Cl...... 260/680 R; 252/466 PT; 260/683.3
[51] Int. Cl................................................ C07c 5/18
[58] Field of Search...................... 260/683.3, 680 R

[56] References Cited
UNITED STATES PATENTS

| | | | |
|---|---|---|---|
| 3,584,060 | 6/1971 | Rausch | 260/669 |
| 3,641,182 | 2/1972 | Box et al. | 260/680 R |
| 3,674,706 | 7/1972 | Box et al. | 252/412 |
| 3,682,838 | 8/1972 | Bloch | 252/464 |
| 3,686,340 | 8/1972 | Patrick et al. | 260/672 R |
| 3,755,481 | 8/1973 | Hayes | 260/668 D |

*Primary Examiner*—Paul M. Coughlan, Jr.

[57] ABSTRACT

Dehydrogenatable organic compounds, diluted with steam, are dehydrogenated in the absence of free oxygen at high conversion and selectivity to less saturated compounds with a catalyst composite consisting essentially of one or more metals selected from the group consisting of Ni, Pd, Pt, Ir and Os in association with tin and a metal selected from the group consisting of cesium, rubidium, thallium and cerium deposited on a support such as alumina, silica or a Group II aluminate spinel.

3 Claims, No Drawings

CATALYTIC DEHYDROGENATION PROCESS

This invention relates to the catalytic dehydrogenation of organic compounds. In one aspect, it relates to dehydrogenation processes. In another aspect, it relates to dehydrogenation catalysts.

The dehydrogenation of organic compounds is well known. While noncatalytic thermal dehydrogenation of organic compounds is known, the use of such methods is limited because of the extensive undesirable side reactions which take place. Thus, a great number of catalytic processes have been developed in order to minimize side reaction activity and improve conversion and selectivity to desired products. Materials which have been proposed as dehydrogenation catalytic agents include Group VIII metals and metal compounds reducible to the metal, e.g. noble metal compounds. Generally, such catalytic agents as the Group VIII metal compoundds have been proposed in combination or association with a carrier or support material such as alumina, silica, and the like. The Group VIII metal compound-containing catalytic agents are characterized by high dehydrogenation activity and selectivity. Such materials, however, are subject to deactivation, particularly by coke laydown, and can lose their activity very quickly, e.g., in a matter of minutes. Hence, although the selectivity and activity of the Group VIII metal, particularly the noble metal, catalytic agents in dehydrogenation processes is excellent, the cost of such agents in relation to their catalytic activity and the need for frequent regeneration has inhibited their acceptance in commercial dehydrogenation applications.

It is also known that the activity and useful life of Group VIII metal-containing catalysts can be increased and extended by incorporating tin into such catalysts. Such catalysts, while overcoming to some extent some of the drawbacks of the Group VIII metal-containing catalysts per se, still exhibit some deficiencies. For example, platinum/tin/zinc aluminate catalysts are highly active and selective for dehydrogenation and dehydrocyclization of paraffins. However, they lose activity during use and require regeneration at periodic intervals, depending upon the feed used. It is highly desirable to decrease, or even eliminate, the need for regeneration.

It is, therefore, an object of this invention to provide an improved dehydrogenation process.

It is an object of this invention to provide improved dehydrogenation catalyst systems.

Other aspects, objects and advantages will become apparent to those skilled in the art upon consideration of the following disclosure.

In accordance with this invention, it has been discovered that the activity and stability of tin-promoted nickel-, palladium-, platinum-, iridium- and osmium-containing catalysts are unexpectedly improved by modifying such catalysts with a metal selected from the group consisting of rubidium, cesium, cerium and thallium and their compounds.

The finished catalyst compositions are useful in dehydrogenation processes wherein a steam-diluted dehydrogenation hydrocarbon is contacted with such catalysts in the vapor phase in the substantial absence of free oxygen.

The novel catalysts of this invention consist essentially of at least one Group VIII metal selected from the group consisting of nickel, platinum, palladium, iridium and osmium, or a compound of such metal capable of reduction, in combination with tin and a co-promoting metal selected from the group consisting of cesium, rubidium, thallium and cerium. The Group VIII metals include nickel, palladium, platinum, iridium and osmium, including compounds of such metals which are capable of reduction, e.g., platinic chloride, chloroplatinic acid, ammonium chloroplatinate and the like and various coordination compounds such as platinum diammine oxalate, platinum hexammine dihydroxide and the like, and mixtures thereof. The Group VIII metal content of the catalysts is in the approximate range of 0.1 to 5 weight percent of the final catalyst.

In addition to the Group VIII metals, the catalyst composition contains tin as a first co-promoter metal. The amount of tin is in the approximate range of 0.01 to 5 weight percent of the final catalyst. The tin component can be deposited with the primary metal component upon the catalytic carrier of the invention, separately or together by any manner known in the art such as by deposition from aqueous and non-aqueous solutions of tin halides, nitrates, oxalates, acetates, oxides, hydroxides and the like.

In addition to the Group VIII metal and tin, the catalyst composition contains a second co-promoter metal or metal compound which is selected from at least one of cesium, rubidium, thallium or cerium or mixtures thereof. The amount of the second co-promoter metal is in the approximate range of 0.1 to 5 weight percent of the final catalyst. Suitable rubidium and cesium compounds include the oxides, hydroxides, oxalates, alkoxides, bicarbonates, carbonates, tartrates and the like. Suitable thallium compounds include the acetates, carbonates, chlorides, hydroxides, nitrates, sulfates and the like. Suitable cerium compounds include the acetates, carbonates, hydroxides, nitrates, sulfates, and the like.

In a preferred embodiment the amount of Group VIII metal, as defined above, is in the approximate range of 0.1–1 weight percent, the amount of tin is in the approximate range of 0.1–2 weight percent and the amount of co-promoter metal is in the approximate range of 0.1–2 weight percent, all weight percents based upon the weight of final catalyst.

The molar ratio of the Group VIII metal to tin can be in the range of 10:1 to 1:10. The molar ratio of the Group VIII metal to the second co-promoter can be in the range of 10:1 to 1:10. In a preferred embodiment the Group VIII metal to tin ratio is in the approximate range of 2:1 to 1:5 and the Group VIII metal to second co-promoter ratio is in the approximate range of 2:1 to 1:3. In a more preferred embodiment the Group VIII metal to tin ratio is about 1:3 and the Group VIII metal to second co-promoter ratio is about 1:1.

The carrier material which is employed in the preparation of the catalyst of this invention include alumina, silica, magnesia, zirconia, alumino-silicates, Group II aluminate spinels and mixtures thereof. In a preferred embodiment the support material is a Group II aluminate spinel, particularly zinc aluminate spinel.

The catalytic materials of this invention can be prepared by any means known in the art, e.g., by coprecipitation with the support material, by impregnation of the support material, by mixing dry powders, by mixing aqueous and non-aqueous slurries and pastes with the support and the like.

During the dehydrogenation reaction, the catalyst, which can be in any suitable form such as granules, pills, pellets, spheres, and the like, will slowly lose some activity and will periodically require a regeneration by conventional means. In one regeneration method, the feedstock is cut off and the catalyst is treated with steam-diluted air such that the oxygen content of the mixture is about 1–5 mol percent. The regeneration treatment can be carried out at temperatures and pressures within the dehydrogenation operating range for about 15 to 60 minutes.

The catalytic dehydrogenation processes of this invention are effected at temperatures within the range of about 750° to about 1,200°F, preferably in the range of 1,000° to 1,100°F, with the exact conditions being dependent upon the feedstock and product desired. Pressures are generally in the range of about 0 to 500 p.s.i.g., and the space velocity is within the range of 200 to 10,000 volumes of feedstock per volume of catalyst per hour (GHSV). The reactions of the invention are carried out in the vapor phase in the presence of steam and in the absence of oxygen at molar ratios of steam to organic feedstock in the range of 2-30:1, preferably 4-10:1.

The processes of this invention are particularly well suited for the dehydrogenation of various dehydrogenatable organic compounds containing at least one

grouping, i.e., adjacent C atoms singly bonded to each other and each attached to at least one hydrogen atom. In addition to carbon and hydrogen, these compounds can also contain nitrogen. Such compounds can contain from 2 to 12 carbon atoms. Among the classes of organic compounds which can be treated according to the processes of this invention are alkanes, cycloalkanes, alkyl aromatic compounds, alkenes, alkyl-substituted pyridines and the like. The catalyst composition of this invention is particularly effective for the dehydrogenation of paraffins having from 2 to 12 carbon atoms.

The catalysts of this invention employing cesium, rubidium and thallium as co-promoters are particularly effective in processes using a fixed bed catalytic reactor. The catalysts of this invention employing cerium as co-promoter are particularly effective in moving bed dehydrogenation processes.

The following examples illustrate the invention.

EXAMPLE I

Tin-Containing Support

A slurry consisting of distilled water, finely divided alumina, finely divided reagent grade zinc oxide and finely divided reagent stannic oxide was ball milled for one hour to obtain an intimate mixture. The slurry was dried overnight at 200°–220°F in a forced draft oven. The resulting dry cake was crushed, sieved to remove coarse particles and the powder was compounded with 8 weight percent of a polyethylene lubricant. The mixture was formed into ⅛-inch pellets and calcined in air in a muffle furnace which was programmed as follows: 2 hours at 800°F, 2 hours at 1,100°F and 3 hours at 1,850°F. After cooling, the calcined pellets were crushed and sieved to obtain 16–20 mesh particles. The thus prepared tin-containing support had a surface area of 12.0 square meters per gram, a pore volume of 0.33 cc per gram and an apparent bulk density of 0.96 gram per cc. The support contained 39 weight percent zinc, 26.8 weight percent aluminum, 1.0 weight percent tin and 33.2 weight percent combined oxygen.

EXAMPLE II

Preparation of Catalyst

Catalyst A: A portion of the tin-containing catalyst support of Example I was impregnated with platinum from an aqueous solution of chloroplatinic acid to form a catalyst composition containing 0.6 weight percent platinum based on the weight of the final catalyst. The mixture was dried 3 hours at 230°F and calcined 3 hours at 1100°F.

Catalyst B: A portion of the tin-containing catalyst support of Example I was impregnated with sodium from an aqueous solution of sodium carbonate to form a catalyst composition containing 0.07 weight percent of sodium based on the weight of the final catalyst. The mixture was dried, then impregnated with an aqueous solution of chloroplatinic acid sufficient to give 0.6 weight percent platinum based on the weight of the final catalyst. This mixture was dried 1 hour at 230°F and calcined 3 hours at 1050°F.

Catalyst C: A portion of the tin-containing catalyst support of Example I was impregnated with rubidium from an aqueous solution of rubidium carbonate to form a catalyst composition containing 0.35 weight percent of rubidium based on the weight of the final catalyst. The mixture was dried, then impregnated with an aqueous solution of chloroplatinic acid sufficient to give 0.6 weight percent platinum based on the weight of the final catalyst. The mixture was dried 1 hour at 230°F and calcined 3 hours at 1,050°F.

Catalysts D-H: Catalysts D-H were prepared by individually impregnating portions of the tin-containing support of Example I with an aqueous solution of cesium carbonate sufficient to give the weight percent of cesium shown in Table I. After drying, each mixture was further impregnated with an aqueous solution of chloroplatinic acid sufficient to give 0.6 weight percent platinum based on the weight of the final catalyst. Each mixture was dried 1 hour at 230°F and calcined 3 hours at 1,050°F.

Catalyst I: A portion of the tin-containing catalyst support of Example I was impregnated with cerium and platinum from an aqueous solution of cerous nitrate and chloroplatinic acid sufficient to give 0.43 weight percent cerium and 0.6 percent platinum based on the weight of the final catalyst. The mixture was dried 1 hour at 220°F and calcined 3 hours at 1,050°F.

Catalyst J: A portion of the tin-containing catalyst support of Example I was impregnated with boron and platinum from an aqueous solution of boric acid and chloroplatinic acid sufficient to give 0.04 weight percent of boron and 0.6 weight percent platinum based on the weight of the final catalyst. The mixture was dried 1 hour at 230°F and calcined 3 hours at 1,050°F.

Catalyst K: A portion of the tin-containing catalyst support of Example I was impregnated with thallium from an aqueous solution of thallous sulfate sufficient to give 0.6 weight percent thallium based on the weight of the final catalyst. The mixture was dried, then impregnated with platinum from an aqueous solution of chloroplatinic acid sufficient to give 0.6 weight percent platinum based on the weight of the final catalyst. The mixture was dried 1 hour at 230°F and calcined 3 hours at 1050°F.

Catalyst L: A slurry consisting of distilled water, finely divided alumina and finely divided reagent grade zinc oxide was ball milled for 1 hour to obtain intimate mixture. The slurry was dried overnight at 200°–220°F in a forced draft oven. The resulting dry cake was crushed, sieved to remove coarse particles and the powder was compounded with 8 weight percent of a polyethylene lubricant. The mixture was formed into ⅛-inch pellets and calcined in air in a muffle furnace which was programmed as follows: 2 hours at 800°F, 2 hours at 1100°F and 3 hours at 1850°F. After cooling, the calcined pellets were crushed and sieved to obtain 16–20 mesh particles. The thus prepared support had a surface area of 12.0 square meters per gram, a pore volume of 0.33 cc per gram and an apparent bulk density of 0.96 gram per cc. The support contained 27.1 weight percent aluminum, 39.3 weight percent zinc and 33.6 weight percent combined oxygen. The support was impregnated with an aqueous solution of cesium carbonate sufficient to give 0.41 weight percent of cesium based on the weight of the final catalyst and the mixture was dried. The mixture was then impregnated with an aqueous solution of chloroplatinic acid sufficient to give 0.6 weight percent of platinum based on the weight of the final catalyst. The mixture was dried 1 hour at 230°F and calcined 3 hours at 1050°F.

EXAMPLE III

Dehydrogenation runs were conducted to determine the effects of Na, Rb and Cs as co-promoters for the Pt/Sn reference catalyst A. n-Butane was dehydrogenated at 1100°F and 100 p.s.i.g. in the presence of 9–10 mols of steam per mol of n-butane and in the substantial absence of free oxygen. In each run, 1.4 cc of catalyst was used. The processes were conducted in a cyclic, continuous flow manner with an intermediate air regeneration of the catalyst. Each cycle consisted of a dehydrogenation step of 11.5 hours at the recited conditions, followed by a catalyst regeneration step of 30 minutes effected at process conditions. Regeneration was accomplished by shutting off the feed without disturbing the steam injection rate for 5 minutes, then admitting sufficient air with the steam to provide about 2 mol percent of oxygen for 20 minutes, followed by another 5-minute purge with steam only. The results shown in Table I are the average of at least 3 such cycles.

The reactor effluent was analyzed by means of gas-liquid chromatography at the times indicated. Total conversion of the n-butane feed is in terms of mole percent. Selectivity is given in terms of the percentage of total products formed converted into butenes and butadiene. Results are given in Table I.

In each of the runs given in Table I the mol ratio of Sn:Pt is 2.74:1.

Table I

| Run No. | 1 | 2 | 3 | 4 | 5 | 6 | 7 | 8 |
|---|---|---|---|---|---|---|---|---|
| Catalyst | A | B | C | D | E | F | G | H |
| Co-Promoter Metal | none | Na | Rb | Cs | Cs | Cs | Cs | Cs |
| weight percent | — | 0.07 | 0.35 | 0.25 | 0.5 | 0.5 | 0.75 | 1.0 |
| mol/mol Pt | — | 0.99 | 1.33 | 0.61 | 1.22 | 1.22 | 1.83 | 2.44 |
| n-Butane, GHSV | 7070 | 6300 | 6500 | 6280 | 6620 | 6420 | 6220 | 6340 |
| 1 Hour on stream | | | | | | | | |
| conversion, % | 32.5 | 34.2 | 36.0 | 37.3 | 38.2 | 36.5 | 26.9 | 24.0 |
| selectivity, % | 94.6 | 94.3 | 95.1 | 95.1 | 94.2 | 95.1 | 94.1 | 92.9 |
| rate constant, K (a) | 11,500 | 10,800 | 13,500 | 12,300 | 14,700 | 12,700 | 6540 | 5470 |
| 6 Hours on stream | | | | | | | | |
| conversion, % | 21.3 | 22.9 | 27.2 | 23.5 | 31.9 | 29.0 | 20.1 | 18.3 |
| selectivity, % | 92.2 | 92.6 | 94.5 | 93.7 | 93.7 | 94.2 | 92.6 | 91.7 |
| K | 5000 | 5250 | 7600 | 5280 | 9900 | 7950 | 3850 | 3720 |
| k (b) | 0.44 | 0.49 | 0.56 | 0.43 | 0.67 | 0.63 | 0.58 | 0.68 |
| 11 Hours on stream | | | | | | | | |
| conversion, % | 15.0 | 16.9 | 22.9 | 16.4 | 27.2 | 24.9 | 18.0 | 16.1 |
| selectivity, % | 87.9 | 90.5 | 93.8 | 92.2 | 93.0 | 93.6 | 91.5 | 90.8 |
| K | 2850 | 3300 | 5500 | 3040 | 7320 | 6060 | 3750 | 3030 |
| k | 0.25 | 0.31 | 0.41 | 0.25 | 0.50 | 0.48 | 0.54 | 0.55 |
| Rate of Decline in Activity, (c) %/hr. | | | | | | | | |
| 1–6 hours on stream | 15.3 | 13.5 | 10.7 | 15.5 | 7.6 | 8.3 | 10.1 | 7.4 |
| 1–11 hours on stream | 13.0 | 11.2 | 8.5 | 13.0 | 6.7 | 7.1 | 5.1 | 5.8 |
| Coke Rate, in mmol/hr. | 0.49 | 0.21 | 0.15 | 0.39 | 0.63 | 0.16 | * | 0.24 |
| $K_o$(d) | 14,500 | 12,900 | 16,000 | 15,600 | 16,200 | 14,900 | 8500 | 6200 |

*Not determined.

(a) dehydrogenation rate constant. $K = \dfrac{(GHSV)(\text{conversion})(\text{selectivity})}{(\text{equilibrium conversion})(\text{equilibrium conversion} - \text{conversion} \times \text{selectivity})}$ (b) relative rate constant $k = \dfrac{K \text{ at 6 or 11 hours}}{K \text{ at 1 hour}}$ (c) $K = (1-r)^{(t-1)}$, where r is the rate of decline and t is the number of hours on steam.

(d) K at time zero. Determined from curves of K vs. time.

Examination of the above data reveals that the reference catalyst, A, while very active and selective for dehydrogenating n-butane, loses such activity rapidly.

The sodium co-promoted catalyst, B, shows a lesser activity decline, compared to the reference, but has lower initial activity. The rubidium and cesium co-promoted catalyst exhibit increased activity and slower rate of deactivation as compared to both the reference catalyst and the sodium co-promoted catalyst.

The above data further illustrate that the optimum cesium level lies between 0.25 and 0.75 weight percent. The optimum level appears to be near 0.5 weight percent, which corresponds to a platinum:cesium mol ratio of about 1:1.

EXAMPLE IV

Runs were conducted to compare the effect of cerium co-promoted catalyst with the reference catalyst. Results are given in Table II. The runs were conducted and effluents analyzed in the manner of Example III. In each of these runs the mol ratio Sn:Pt is 2.74:1.

Cerium is shown to give greatly enhanced activity to the reference catalyst. The cerium co-promoted catalyst exhibits such activity up to more than 1 hour but less than 6 hours. In view of its initial activity, the catalyst appears to be well suited for moving bed reactor applications wherein the catalyst briefly contacts the feedstock and is then removed and regenerated for reuse.

EXAMPLE V

Dehydrogenation runs were conducted according to the procedures set forth in Example III to compare catalysts A, J and K. Results of these runs are given in Table III. In each of these runs the mol ratio Sn:Pt is 2.74:1.

Table III

| Run No. | 1 | 10 | 11 |
|---|---|---|---|
| Catalyst | A | J | K |
| Co-Promoter Metal | none | B | Tl |
| weight percent | — | 0.04 | 0.6 |
| mol/mol Pt. | — | 1.2 | 0.9 |
| n-Butane, GHSV | 7070 | 6180 | 6490 |
| 1 Hour on stream | | | |
| conversion, % | 32.5 | 35.8 | 38.6 |
| selectivity, % | 94.6 | 91.0 | 95.0 |
| K | 11,500 | 10,600 | 14,400 |
| 6 Hours on stream | | | |
| conversion, % | 21.3 | 25.2 | 28.7 |
| selectivity, % | 92.2 | 88.7 | 94.6 |
| K | 5000 | 5140 | 7500 |
| k | 0.44 | 0.48 | 0.52 |
| 11 Hours on stream | | | |
| conversion, % | 15.0 | 16.9 | 21.2 |
| selectivity, % | 87.9 | 85.9 | 93.4 |
| K | 2850 | 2800 | 4600 |
| k | 0.25 | 0.26 | 0.32 |
| Rate of Decline in Activity, %/hour | | | |
| 1–6 hours on stream | 15.3 | 13.5 | 12.2 |
| 1–11 hours on stream | 13.0 | 12.5 | 10.7 |
| Coke rate, mmols/hr. | 0.49 | 1.28 | 0.29 |
| $K_o$ | 14,500 | 12,300 | 17,200 |

Table II

| Run No. | 1 | 9 |
|---|---|---|
| Catalyst | A | I |
| Co-Promoter Metal | none | Ce |
| weight percent | — | 0.43 |
| mol/mol Pt | — | 1.0 |
| n-Butane, GHSV | 7070 | 6270 |
| 1 Hour on stream | | |
| conversion, % | 32.5 | 40.4 |
| selectivity, % | 94.6 | 94.7 |
| K | 11,500 | 16,400 |
| 6 Hours on stream | | |
| conversion, % | 21.3 | 9.6 |
| selectivity, % | 92.2 | 86.4 |
| K | 5000 | 1490 |
| k | 0.44 | 0.09 |
| 11 Hours on stream | | |
| conversion, % | 15.0 | 4.4 |
| selectivity, % | 87.9 | 74.0 |
| K | 2850 | 500 |
| k | 0.25 | 0.03 |
| Rate of decline in Activity, %/hr. | | |
| 1–6 hours on stream | 15.3 | 38.2 |
| 1–11 hours on stream | 13.0 | 29.4 |
| Coke rate, mmol/hr. | 0.49 | 0.29 |
| $K_o$ | 14,500 | 60,000 |

The above data indicate that thallium is an effective co-promoter for the basic catalyst, exhibiting a lesser rate of decline in activity together with better yield and selectivity. In contrast, boron, also a Group IIIa element, reduced the selectivity of the reference catalyst and exhibited greatly increased formation of coke.

EXAMPLE VI

Dehydrogenation runs were conducted to compare a platinum/tin catalyst containing no co-promoter metal, catalyst A, with a catalyst containing platinum and a co-promoter metal but not containing tin, catalyst L. For comparison, catalysts E and F, both of which contain tin and a co-promoter metal, are included. The runs were conducted and effluents analyzed in the manner of Example III. The results are present in Table IV.

Table IV

| Run | 1 | 12 | 5 | 6 |
|---|---|---|---|---|
| Catalyst | A | L | E | F |
| Pt, weight percent | 0.6 | 0.6 | 0.6 | 0.6 |
| Sn, weight percent | 1.0 | none | 1.0 | 1.0 |
| mol Sn/mol Pt | 2.74 | — | 2.74 | 2.74 |
| Promoter Metal | none | Cs | Cs | Cs |
| weight percent | — | 0.41 | 0.5 | 0.5 |
| mol/mol Pt. | — | 1 | 1.22 | 1.22 |
| n-Butane, GHSV | 7070 | 6500 | 6620 | 6420 |
| 1 Hour on stream | | | | |
| conversion, % | 32.5 | 11.4 | 38.2 | 36.5 |
| selectivity, % | 94.6 | 68.9 | 94.2 | 95.1 |
| K | 11,500 | 1730 | 14,700 | 12,700 |
| 6 Hours on stream | | | | |
| conversion, % | 21.3 | 7.0 | 31.9 | 29.0 |
| selectivity, % | 92.2 | 58.8 | 93.7 | 94.2 |
| K | 5000 | 880 | 9900 | 7950 |
| k | 0.44 | 0.51 | 0.67 | 0.63 |
| 11 Hours on stream | | | | |
| conversion, % | 15.0 | 6.0 | 27.2 | 24.9 |
| selectivity, % | 87.9 | 58.3 | 93.0 | 93.6 |
| K | 2850 | 700 | 7320 | 6060 |
| k | 0.25 | 0.4 | 0.50 | 0.48 |
| Rate of Decline in Activity, %/hr. | | | | |
| 1–6 hours on stream | 15.3 | 12.6 | 7.6 | 8.3 |
| 1–11 hours on stream | 13.0 | 8.6 | 6.7 | 7.1 |
| Coke rate, mmol/hr. | 0.49 | 0.09 | 0.63 | 0.16 |
| $K_o$ | 14,500 | 2200 | 16,200 | 14,900 |

The above data illustrate that tin is a necessary component of the catalyst system of this invention. In the absence of tin, the values for conversion, selectivity and rate constants are drastically reduced compared to reference catalyst A. Such values are also drastically reduced as compared to catalysts E and F which contained roughly similar amounts of cesium.

Reasonable variations and modifications are possible within the scope of this disclosure without departing from the scope and spirit thereof.

I claim:

1. A process for the dehydrogenation of a dehydrogenatable organic compound having from 2 to 12 carbon atoms per molecule in the presence of steam and in the absence of free oxygen which comprises contacting said compound under dehydrogenation conditions with a catalyst consisting essentially of platinum, tin and cerium, each of said platinum, tin and cerium being supported on a support selected from the group consisting of alumina, silica, magnesia, zirconia, alumina-silicates, Group II aluminate spinels and mixtures thereof;

wherein said platinum is present in said catalyst in an amount ranging from about 0.1 to about 1 weight percent; said tin is present in an amount ranging from about 0.1 to about 2 weight percent; and said cerium is present in an amount ranging from about 0.1 to about 2 weight percent, all weight percents being based on the weight of final catalyst; and wherein the mole ratio of said platinum to said tin is about 1:3 and the mole ratio of said platinum to said cerium is about 1:1.

2. The process of claim 1 wherein said support is zinc aluminate.

3. The process of claim 2 wherein said organic compound is butane.

* * * * *